United States Patent
Komatsu

(10) Patent No.: US 11,146,643 B2
(45) Date of Patent: Oct. 12, 2021

(54) MESSAGE BUS AGENT APPARATUS, SIGNALING SERVER, MESSAGE BUS MANAGEMENT SERVER, CONNECTION ESTABLISHMENT METHOD, AND PROGRAM

(71) Applicant: NTT Communications Corporation, Chiyoda-ku (JP)

(72) Inventor: Kensaku Komatsu, Mountain View, CA (US)

(73) Assignee: NTT Communications Corporation, Chiyoda-ku (JP)

( * ) Notice: Subject to any disclaimer, the term of this patent is extended or adjusted under 35 U.S.C. 154(b) by 0 days.

(21) Appl. No.: 16/495,233

(22) PCT Filed: Feb. 26, 2018

(86) PCT No.: PCT/JP2018/006936
§ 371 (c)(1),
(2) Date: Sep. 18, 2019

(87) PCT Pub. No.: WO2018/173639
PCT Pub. Date: Sep. 27, 2018

(65) Prior Publication Data
US 2020/0021660 A1    Jan. 16, 2020

Related U.S. Application Data

(60) Provisional application No. 62/475,286, filed on Mar. 23, 2017.

(30) Foreign Application Priority Data

May 17, 2017 (JP) .............................. JP2017-098501

(51) Int. Cl.
*H04L 29/08* (2006.01)
*H04L 12/46* (2006.01)
(Continued)

(52) U.S. Cl.
CPC ............ *H04L 67/141* (2013.01); *H04L 12/40* (2013.01); *H04L 12/4641* (2013.01);
(Continued)

(58) Field of Classification Search
CPC ..... H04L 67/12; H04L 67/104; H04L 67/141; H04L 12/40; H04L 12/4641;
(Continued)

(56) References Cited

U.S. PATENT DOCUMENTS 9,432,794 B2 *  8/2016  Agrawal ........... H04M 15/8044
9,584,440 B1 *  2/2017  Blakely .............. H04L 67/1021
(Continued)

FOREIGN PATENT DOCUMENTS

GB      201721813   *  2/2018  ............ H04W 12/06
JP      2014-241024 A   12/2014
(Continued)

OTHER PUBLICATIONS

Diaz et al., State-of-the-art, challenges, and open issues in the integration of Internet of things and cloud computing, Journal of Network and Computer Applications, vol. 67, 2016, pp. 99-117, ISSN 1084-8045, https://doi.org/10.1016/j.jnca.2016.01.010 (Year: 2016).*

(Continued)

*Primary Examiner* — Kostas J Katsikis
(74) *Attorney, Agent, or Firm* — Oblon, McClelland, Maier & Neustadt, L.L.P.

(57) ABSTRACT

A message bus agent apparatus that is used as a first message bus agent apparatus in a system including a message bus management server, a signaling server, the first message bus agent apparatus, and a second message bus agent apparatus, the message bus agent apparatus including: signaling means that transmits, to the signaling server, a signaling message in which an agent ID of the second message bus agent appa- (Continued)

ratus issued from the message bus management server is designated as a connection destination; and connection means that establishes a connection with the second message bus agent apparatus as a virtual message bus based on processing of a signaling message by the signaling server.

7 Claims, 15 Drawing Sheets

(51) Int. Cl.
    *H04L 12/40*         (2006.01)
    *H04L 12/24*         (2006.01)

(52) U.S. Cl.
    CPC ............ *H04L 41/046* (2013.01); *H04L 67/12* (2013.01); *H04L 67/104* (2013.01)

(58) Field of Classification Search
CPC . H04L 41/046; H04L 12/462; H04L 12/2803; H04L 12/4633; H04L 29/06612; H04L 45/00; H04L 49/00; H04L 65/00; H04L 65/1069; H04L 67/06; H04L 67/24; H04L 67/32; H04L 67/1002; H04W 4/70; H04W 84/10; H04W 92/18; H04N 21/632; G06F 16/27; G05B 19/4185; A63F 13/30; A63F 13/34
See application file for complete search history.

(56) References Cited

U.S. PATENT DOCUMENTS

| | | | | |
|---|---|---|---|---|
| 9,762,556 | B2* | 9/2017 | James | H04L 63/0442 |
| 9,935,950 | B2* | 4/2018 | Yacoub | H04L 63/0876 |
| 10,135,790 | B2* | 11/2018 | Lapidous | H04L 12/4641 |
| 10,135,791 | B2* | 11/2018 | Lapidous | H04L 63/0227 |
| 10,135,792 | B2* | 11/2018 | Lapidous | H04L 67/02 |
| 10,375,079 | B2* | 8/2019 | Infante-Lopez | H04W 4/80 |
| 10,447,683 | B1 | 10/2019 | Loladia | H04W 4/50 |
| 10,454,977 | B2* | 10/2019 | Amento | H04L 65/1063 |
| 10,541,976 | B2* | 1/2020 | Lapidous | H04L 63/0272 |
| 10,547,591 | B2* | 1/2020 | Lapidous | H04L 63/029 |
| 10,581,839 | B2* | 3/2020 | Lapidous | H04L 63/083 |
| 10,600,083 | B2* | 3/2020 | Capt | G06Q 30/0252 |
| 10,644,961 | B2* | 5/2020 | Nolan | H04L 43/0876 |
| 10,735,284 | B2* | 8/2020 | Jalali | G06N 20/00 |
| 2004/0003046 | A1* | 1/2004 | Grabelsky | H04L 65/608 709/206 |
| 2014/0219167 | A1* | 8/2014 | Santhanam | H04W 28/0268 370/328 |
| 2014/0348044 | A1* | 11/2014 | Narayanan | H04L 65/1016 370/310 |
| 2015/0081769 | A1* | 3/2015 | Mandyam | H04L 67/02 709/203 |
| 2016/0065636 | A1* | 3/2016 | Cheung | H04L 67/1042 709/219 |
| 2016/0119788 | A1* | 4/2016 | Mandyam | H04L 65/1073 455/411 |
| 2016/0127199 | A1* | 5/2016 | Ding | H04L 67/02 709/226 |
| 2016/0149836 | A1* | 5/2016 | Narayanan | H04L 65/1033 709/206 |
| 2016/0171090 | A1* | 6/2016 | Schwartz | G06Q 10/101 707/730 |
| 2016/0192029 | A1* | 6/2016 | Bergstrom | H04L 12/18 725/109 |
| 2016/0205078 | A1* | 7/2016 | James | H04L 63/0823 713/171 |
| 2016/0205097 | A1* | 7/2016 | Yacoub | H04L 63/102 726/6 |
| 2016/0205106 | A1* | 7/2016 | Yacoub | H04L 63/101 726/28 |
| 2016/0294913 | A1* | 10/2016 | Jansson | H04L 67/2809 |
| 2016/0337127 | A1* | 11/2016 | Schultz | H04L 9/3268 |
| 2016/0366102 | A1* | 12/2016 | Smith | H04W 12/0433 |
| 2017/0060112 | A1* | 3/2017 | Pirner | G06F 21/79 |
| 2017/0060574 | A1* | 3/2017 | Malladi | G06F 9/542 |
| 2017/0063798 | A1* | 3/2017 | Lapidous | H04L 63/029 |
| 2017/0063802 | A1* | 3/2017 | Lapidous | H04L 63/10 |
| 2017/0063940 | A1* | 3/2017 | Lapidous | H04L 12/4641 |
| 2017/0187597 | A1* | 6/2017 | Nolan | H04L 43/10 |
| 2017/0187625 | A1* | 6/2017 | Nolan | H04L 47/263 |
| 2017/0187642 | A1* | 6/2017 | Nolan | H04L 67/2852 |
| 2017/0235616 | A1* | 8/2017 | Baughman | H04L 67/18 718/104 |
| 2017/0331887 | A1* | 11/2017 | Fishier | H04L 63/0428 |
| 2017/0374042 | A1* | 12/2017 | James | H04L 63/0823 |
| 2018/0007055 | A1* | 1/2018 | Infante-Lopez | H04W 4/80 |
| 2018/0014147 | A1* | 1/2018 | Johnston | H04L 67/104 |
| 2018/0020492 | A1* | 1/2018 | Dao | H04L 61/20 |
| 2018/0041641 | A1* | 2/2018 | Shapira | H04L 65/80 |
| 2018/0097690 | A1* | 4/2018 | Yocam | H04W 4/70 |
| 2018/0167410 | A1* | 6/2018 | Johns | H04N 5/225 |
| 2018/0191814 | A1* | 7/2018 | Kinarti | H04L 67/1034 |
| 2018/0234351 | A1* | 8/2018 | Amento | G06F 9/5072 |
| 2018/0253758 | A1* | 9/2018 | Capt | G06Q 30/0244 |
| 2018/0300124 | A1* | 10/2018 | Malladi | H04L 12/2823 |
| 2018/0302370 | A1* | 10/2018 | Nakahara | H04L 61/2535 |
| 2018/0324024 | A1* | 11/2018 | Jang | H04L 29/06176 |
| 2018/0376107 | A1* | 12/2018 | Shibaev | G06F 3/0488 |
| 2019/0052605 | A1* | 2/2019 | Lapidous | H04L 63/029 |
| 2019/0052606 | A1* | 2/2019 | Lapidous | H04L 65/1069 |
| 2019/0052630 | A1* | 2/2019 | Lapidous | H04L 63/0853 |
| 2019/0190802 | A1* | 6/2019 | Jalali | H04L 67/1042 |
| 2019/0297086 | A1* | 9/2019 | Infante-Lopez | G06N 5/047 |
| 2019/0349190 | A1* | 11/2019 | Smith | H04L 69/18 |
| 2019/0349426 | A1* | 11/2019 | Smith | H04L 67/104 |
| 2020/0007594 | A1* | 1/2020 | Amento | G06F 9/5072 |
| 2020/0021660 | A1* | 1/2020 | Komatsu | H04L 12/40 |

FOREIGN PATENT DOCUMENTS

| | | | | |
|---|---|---|---|---|
| JP | 2016-152506 A | | 8/2016 | |
| JP | 2016-212596 A | | 12/2016 | |
| JP | 6082156 B1 | | 2/2017 | |
| WO | WO-2015157362 A1 * | | 10/2015 | ............ H04L 65/80 |
| WO | WO-2016080816 A1 * | | 5/2016 | ........... H04L 67/142 |
| WO | WO-2018005362 A1 * | | 1/2018 | ............ H04W 4/70 |

OTHER PUBLICATIONS

International Search Report dated Apr. 10, 2018 in PCT/JP2018/006936 filed on Feb. 26, 2018.
Japanese Office Action dated Apr. 3, 2018 in Japanese Patent Application No. 2017-098501, filed on May 17, 2017.
Japanese Office Action dated Jan. 22, 2019 in Japanese Patent Application No. 2017-098501, filed on May 17, 2017.
Japanese Office Action dated Mar. 31, 2020 in Japanese Patent Application No. 2017-98051 (with English translation), 37 pages.
Computer Telephony, Ric Telecom, 2015, Sep. 20, 2016, vol. 18 No. 10, pp. 4-5, 72-76, and 88 with cover pages.
Koji, N., et al.. "Evaluation of the Establishment and Efficiency of P2P networks using WebRTC" (3) (2), 78 (2016), Mar. 10, 2016, pp. 3-312~3-314 with cover pages.

* cited by examiner

FIG.4

| | DIRECT ACCESS TYPE | CLOUD TYPE | HYBRID TYPE |
|---|---|---|---|
| ACCESS METHOD TO DEVICE | DIRECT ACCESS TO DEVICE | ACCESS TO MESSAGE BUS LOCATED IN CLOUD | ACCESS TO CLOUD OR EDGE MESSAGE BUS ACCORDING TO DATA TYPE TO MONITOR |
| SCALE OF APPLICATION | SMALL | MEDIUM | LARGE |
| EASINESS OF SYSTEM CONSTRUCTION | CONSTRUCT ONLY EDGE | BOTH OF CLOUD AND EDGE ARE NECESSARY TO CONSTRUCT | CONSTRUCTION OF BOTH EDGE AND CLOUD, AND SEPARATION OF COMPUTING ACCORDING TO DATA TYPE ARE NECESSARY |
| ID MANAGEMENT | COMPLICATED WHEN NUMBER OF TARGET DEVICES INCREASE SINCE CONNECTION SETTING TO IDM IS NECESSARY FOR ALL DEVICES | CONNECTION SETTING TO IDM FOR ONLY CLOUD PART | IDM SETTING IS NECESSARY FOR COMPUTING OF BOTH CLOUD AND EDGE |
| INFLUENCE WHEN NW FAILURE BETWEEN CLOUD AND EDGE | NO INFLUENCE | EDGE SIDE CAN DO NOTHING WHEN NW FAILURE OCCURS | PROCESSING OF EDGE CAN BE CONTINUED EVEN WHEN NW FAILURE |

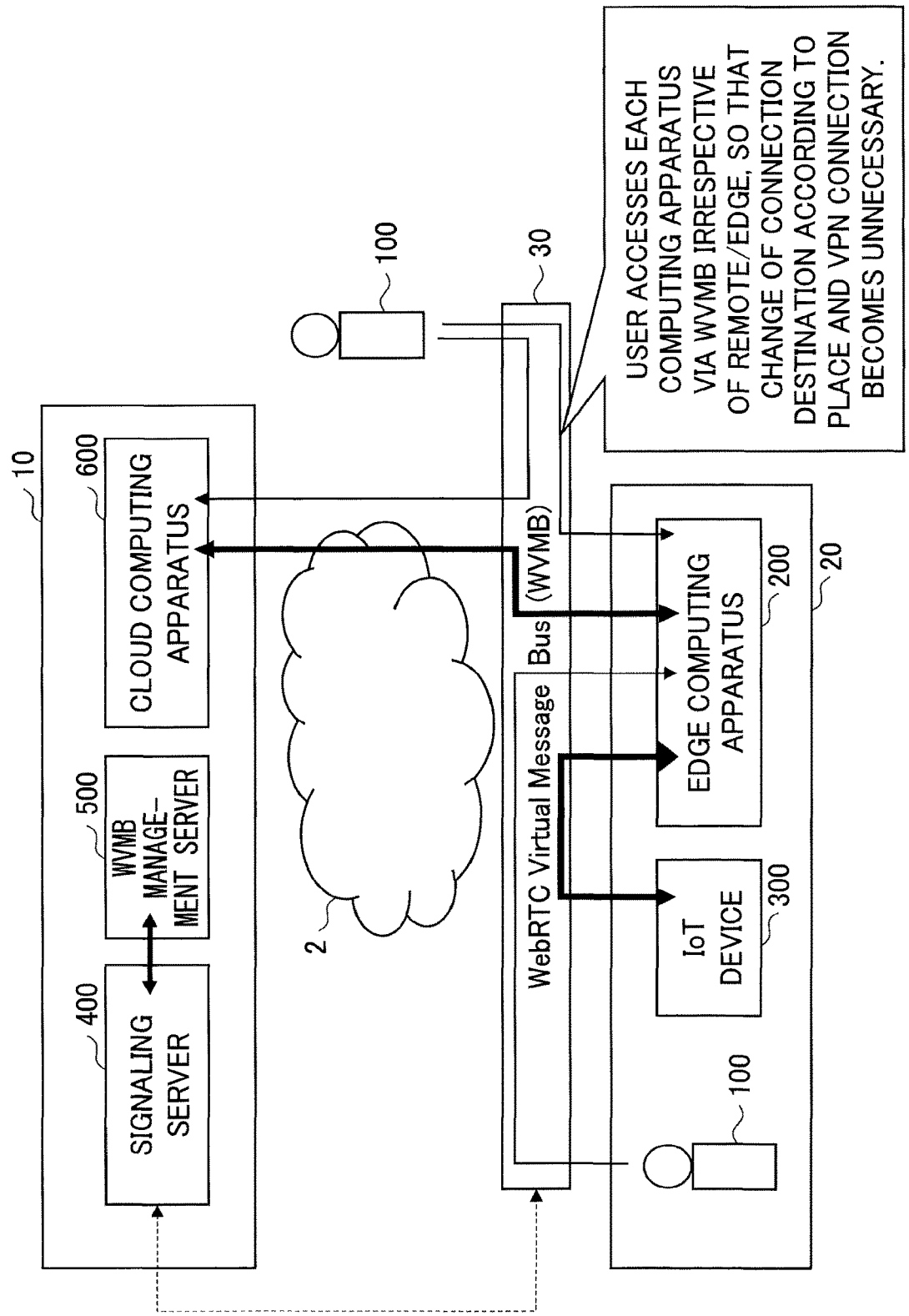

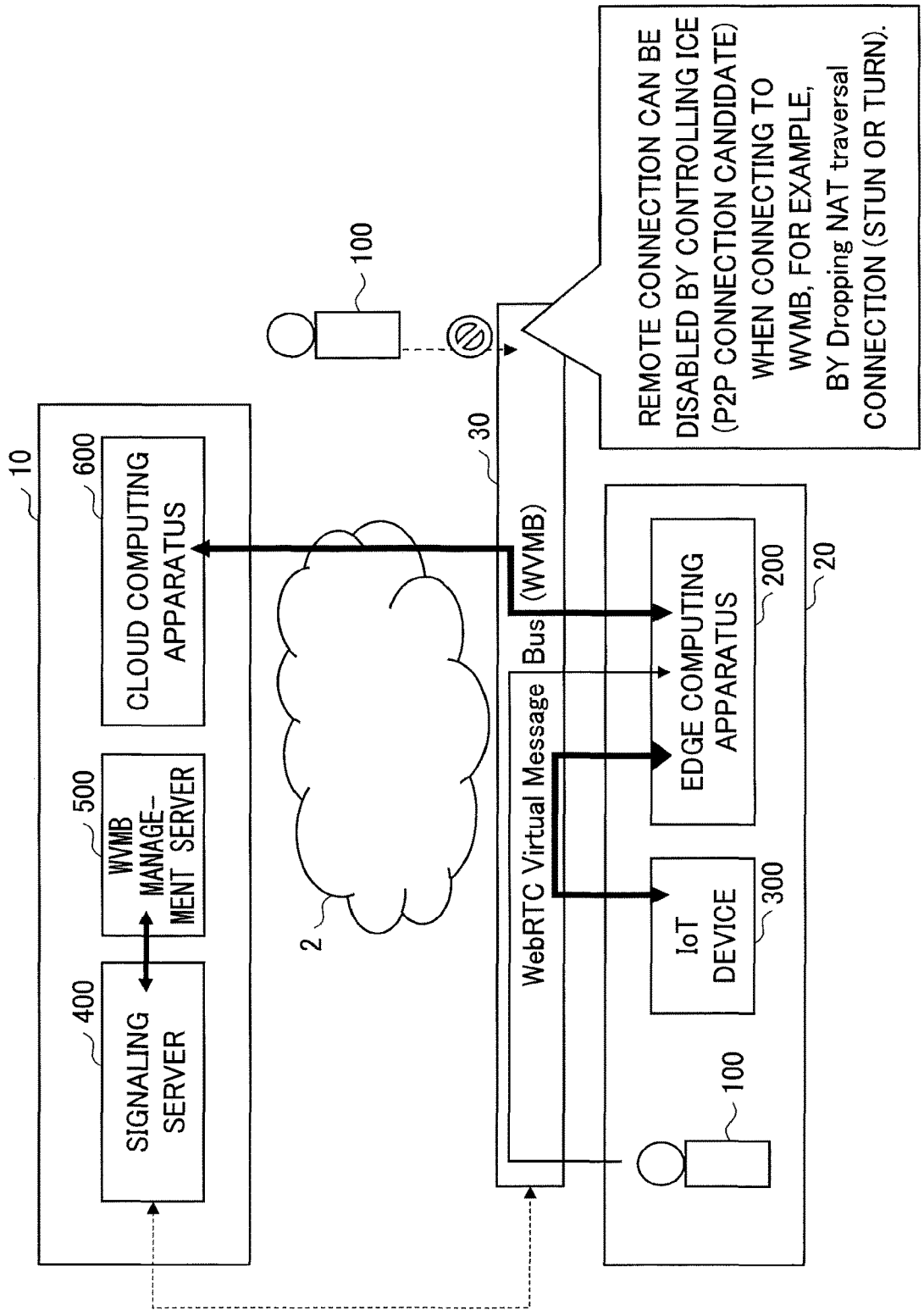

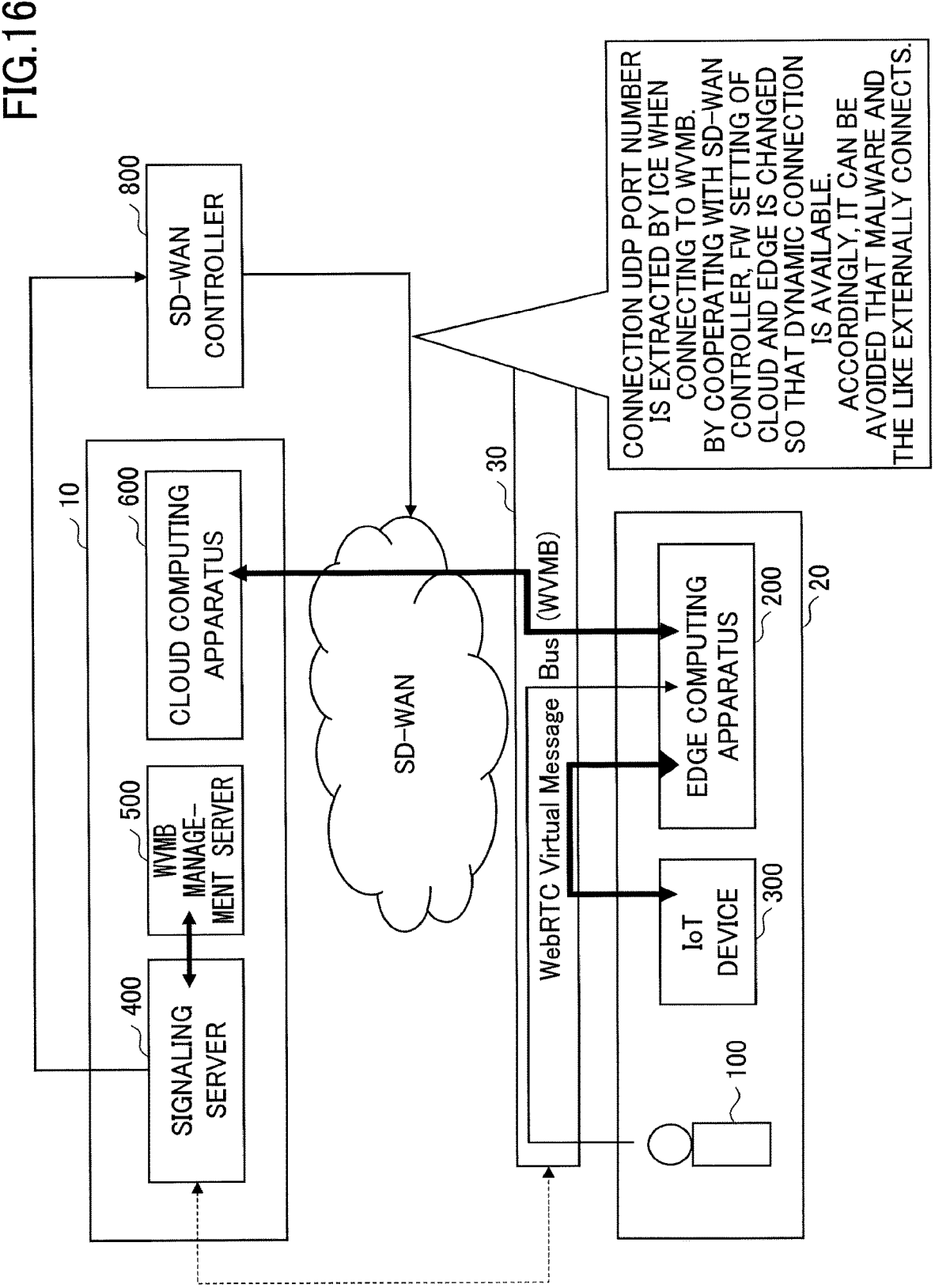

MESSAGE BUS AGENT APPARATUS, SIGNALING SERVER, MESSAGE BUS MANAGEMENT SERVER, CONNECTION ESTABLISHMENT METHOD, AND PROGRAM

TECHNICAL FIELD

The present invention relates to remote control techniques for IoT devices.

BACKGROUND ART

With recent advances in computing technology such as IoT, it has become common to install IoT devices in an edge environment such as base offices, factories and retail stores in enterprise use cases, and homes and other places in consumer use cases, to collect sensor data, and to be monitored and operated using terminals such as smartphones.

By using this method, for example, reduction of power consumption can be realized. Specifically, for example, following functions can be realized.

An IoT-enabled lighting device installed, and by detecting a smartphone, the lighting device is turned on when a person is approaching, and turned off automatically when the person leaves.

An IoT device equipped with an illumination intensity sensor is linked with a lighting device to automatically turn off the lighting device or perform control the amount of light according to light from the outside.

Here, these controls of IoT devices are assumed to be used not only from an edge environment but also from a remote environment. For example, following examples can be considered.

Remotely accesses a lighting device in a house and turns it off if someone failed to turn off, and turns it on at night for security purposes.

Lighting status of each office is collected using a cloud server environment, and a headquarter planning department analyzes the collected data and formulates a plan for grasping the status of office usage and effective utilization.

PRIOR ART DOCUMENTS

Patent Documents

[Patent Document 1] JP2014-241024

SUMMARY OF INVENTION

Problem to be Solved by the Invention

As conventional technologies for remotely controlling IoT devices, there are a technology in which a user terminal connects directly to an IoT device and a technology in which the user terminal connects to the IoT device via a cloud. However, the technology that directly connects to the IoT device is complicated to manage other than small-scale systems, and the technology that connects to the IoT device via the cloud receives a significant impact when failure of a connection network with the cloud occurs, and cannot be applied to large-scale systems.

The present invention has been made in view of the foregoing, and an object of the present invention is to provide a technique that enables appropriate remote control of an IoT device without depending on the size of the system to be applied.

Means for Solving Problems

According to the disclosed technique, there is provided a message bus agent apparatus that is used as a first message bus agent apparatus in a system including a message bus management server, a signaling server, the first message bus agent apparatus, and a second message bus agent apparatus, the message bus agent apparatus including:

signaling means that transmits, to the signaling server, a signaling message in which an agent ID of the second message bus agent apparatus issued from the message bus management server is designated as a connection destination; and connection means that establishes a connection with the second message bus agent apparatus as a virtual message bus based on processing of a signaling message by the signaling server.

Effects of the Invention

The disclosed technique provides a technique that enables appropriate remote control of an IoT device without depending on the size of the system to be applied.

BRIEF DESCRIPTION OF DRAWINGS

FIG. 4 is a table summarizing the characteristics of each scheme.

FIG. 14 is a diagram illustrating variations of step 400.

FIG. 15 is a diagram for explaining a flexible access control.

FIG. 16 is a diagram illustrating an example of using an SD-WAN controller.

MODE FOR CARRYING OUT THE INVENTION

Hereinafter, embodiments of the present invention (the present embodiment) will be described with reference to the drawings. The embodiments described below are just one example, and the embodiments to which the present invention is applied are not limited to the following embodiments.

(Summary of Technology According to the Present embodiment)

Before describing the technology according to the present embodiment in detail, what kind of consideration process was gone thorough to invent the technology will be described.

In order to realize each use case described in the background art, it is necessary that a target IoT device can be accessed both from edge and remotely. A simple implementation would be to allow the IoT device at the edge to be accessed not only from the edge but also remotely.

Figure 1:
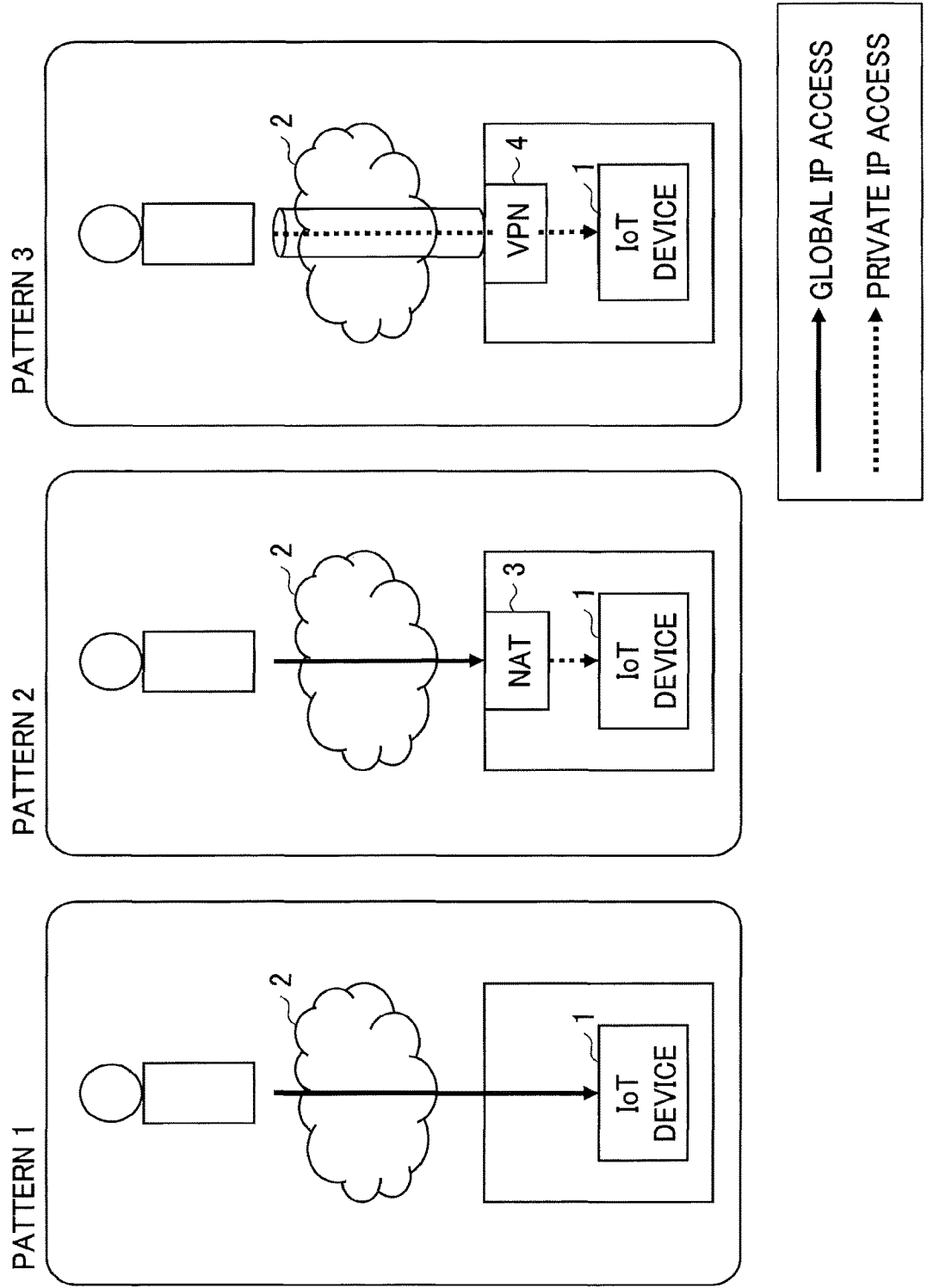
FIG. 1 illustrates a pattern of remote access to an IoT device at an edge.

Technically breaking down the method to allow direct and remote access, for example, there are patterns 1-3 shown in FIG. 1.

In Pattern 1, an IoT device 1 at the edge is given a global address so that it can be accessed directly from the Internet 2.

In pattern 2, an address translation rule is set on a NAT device 3 at the edge so that the IoT device 1 can be accessed from the Internet 2.

In Pattern 3, VPN access to the edge is enabled, and VPN connection is made from a remote device using a VPN device 4, thereby allowing access to the IoT device 1.

Here, Pattern 1 is not realistic in the current situation where IPv4 addresses are depleted. Although IPv6 solves the problem of address use, direct access to the device from the Internet means that the device can be easily controlled by a third party and is undesirable from a security perspective. As to Pattern 2, there are advantages that can be realized in IPv4 environments, but there are problems that are almost the same as Pattern 1. In addition, the setting of the address conversion rule of the NAT device 3 requires knowledge of IP technologies, and thus the setting cost is incurred. As to Pattern 3, it is practical to apply it to the enterprise use case, but it is not realistic to install and use the VPN device 4 in each home in the consumer use case. In addition, there is a problem that if the VPN is connected, anyone can access each device.

In any case of Patterns 1-3, control for a device at the edge location often requires access control depending on employee's authority. For example, general employees may only be able to monitor the lighting status of lighting apparatuses, and only those in charge of a specific department may remotely operate lighting on and off.

Moreover, there is a problem that if a worm enters the site by mistake, equipment is easily operated. Therefore, it is not sufficient that the device can be merely accessed through a VPN connection or the like. User authentication is further required when the device is accessed. Therefore, access control in cooperation with IDM (ID Management), such as LDAP and SNS authentication, is required.

However, mounting and setting up such an IDM mechanism in each device can complicate management. Also, since authentication is required to access each device, usability is degraded.

Figure 2:
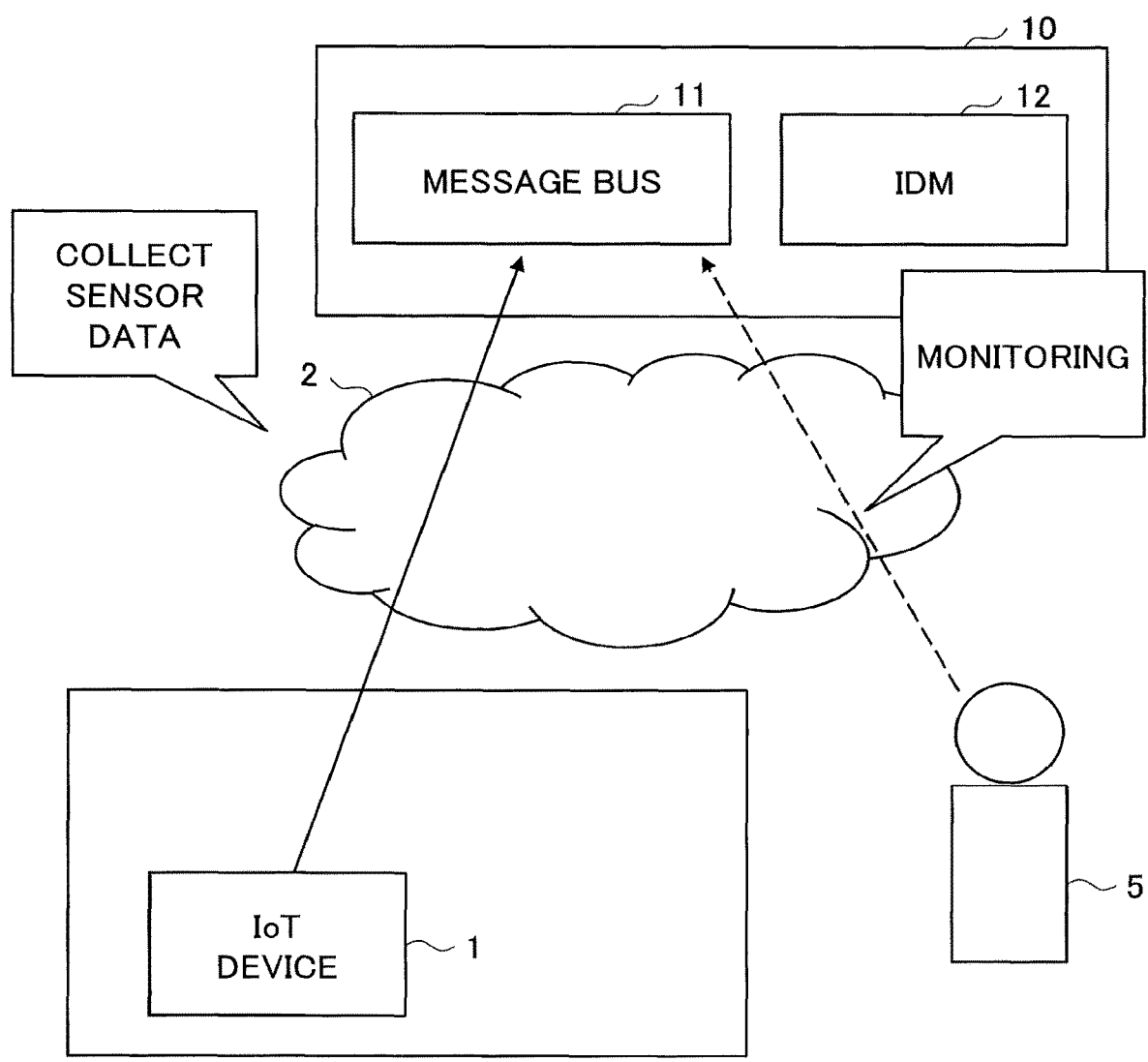
FIG. 2 illustrates a centralized control architecture from a cloud.

As a technique for solving the problems, there is a scheme (architecture) of centralized control from the cloud shown in FIG. 2. In this architecture, all of the devices 1 are connected only to a message bus 11 such as MQTT and Kafka on the cloud 10, and an analysis and control system of the user 5 can monitor and control each device via the message bus 11.

By using this architecture, access control by IDM 12 according to the user privileges described above can be facilitated. In this architecture, the control of device 1 from the user 5 is all via the server of the cloud 10. Accordingly, access control can be improved with this server and the management cost of IDM 12 can be drastically reduced.

However, this architecture also has disadvantages. In this model, all data passes through the cloud 10, so the amount of data is enormous and the processing costs are problematic. Also, at each edge, the cloud 10 must be accessed to control the device. This can cause problems such as lack of operability in times of concentration of access or network failure.

Figure 3:
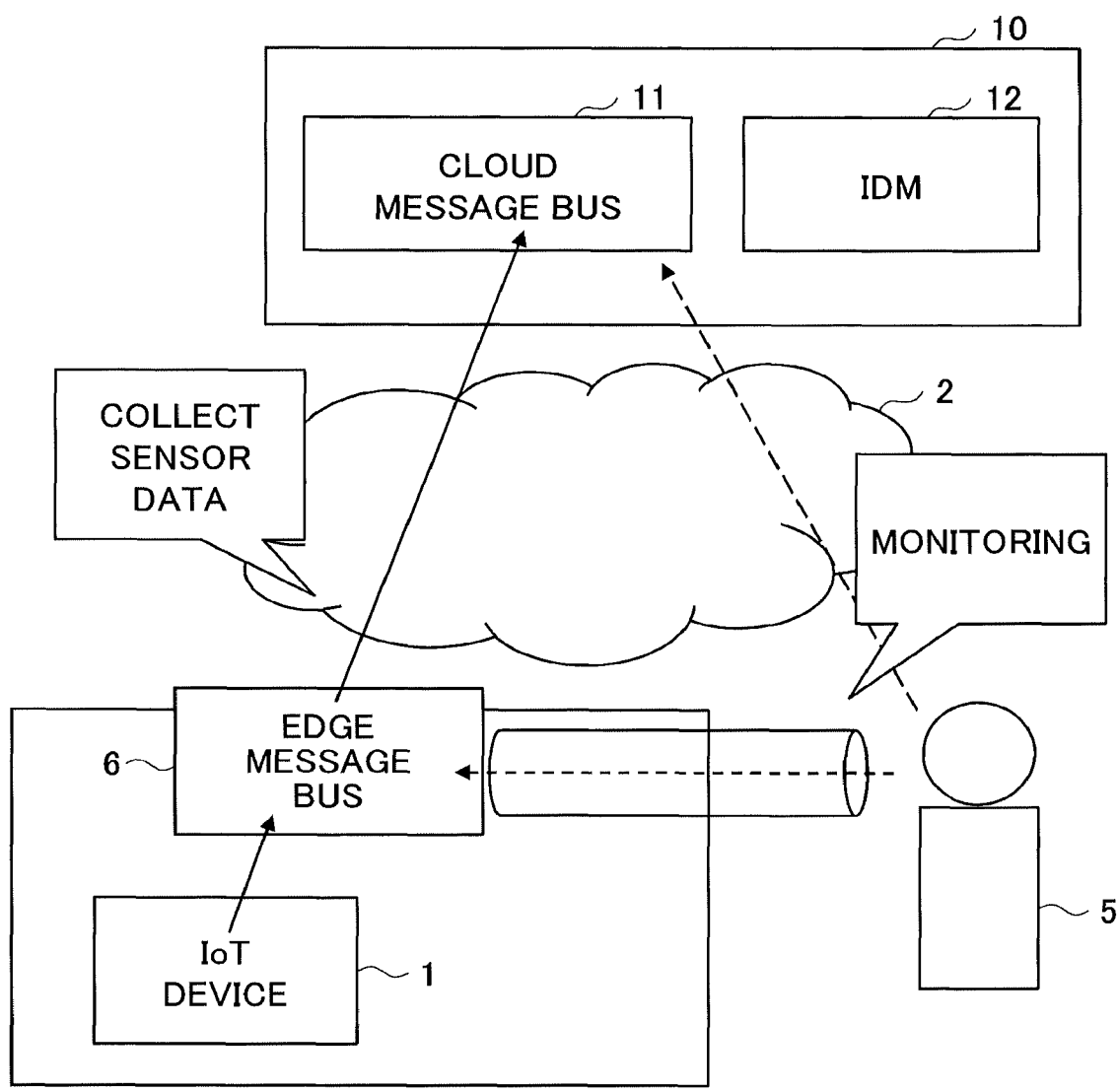
FIG. 3 illustrates a hybrid architecture.

To solve this, a hybrid architecture is envisioned that utilizes both the cloud 10 and edge computing, as shown in FIG. 3. This architecture attempts to solve these problems by setting up a message bus 6 such as MQTT and a processing server of the user 5 connected to the message bus 6 in the edge environment, and coordinating the computing of the cloud 10 and the edge.

Taking lighting control as an example, an illuminance sensor and a lighting device (example of the IoT device 1) are all connected to the message bus 6 of the edge. The edge computing environment of the user 5 connects to the edge message bus 6 and constantly monitors the sensor value. When the threshold is exceeded (e.g., when it is darkened), the lighting device is operated from the edge to turn the lighting on and off and control the amount of light. As described above, all processing is performed at the edge only, and the problems of increasing the load on the cloud 10 and worsening the response are solved. In addition, cost related to cloud due to load increase can be reduced by transmitting, to the cloud 10, only average data per minute for example, or transmitting data only when the threshold is exceeded. Further, also as to the access control according to the user's authority, it is only necessary to install cooperation function with the IDM 12 only in the cloud 10 and the edge comporting environment, and it not necessary to apply the cooperation function to each device of the edge. This makes it possible to reduce the management and control costs of access restrictions. However, although such a hybrid architecture is better than managing each device, it is more complicated than the cloud architecture shown in FIG. 2.

As shown in FIG. 4, each scheme has its own advantages and disadvantages, and which scheme to use is a trade-off between system management cost and scalability. In short, it is typical to use the Direct Access Type when the size is small and the Cloud Type or Hybrid Type when the size is increasing. Accordingly, a plan to introduce each scheme in stages is realistic. However, these three schemes are not a common architecture, and it is necessary to formulate a transition plan for the transition. It is also necessary to change the user's system manual and share it.

This problem results in the assumption that in order to access all resources, it is necessary to access a server managing the data. Recent IT environment configurations are categorized into front-end rendering systems, control logic systems that process user-to-IoT data, data sources, and authentication and authorization mechanisms. Briefly, the front-end rendering system is a dashboard server, the control logic system is a control server, the data source is a data bus such as MQTT or Kafka, and authentication and authorization is IDM. The service cannot be provided if it cannot be connected directly or indirectly to these servers. That is, some means (such as placing a DMZ in the FW, connecting to the VPN, etc.) must always be IP-reachable for each of these servers.

However, this situation has changed in recent years due to high performance and low cost of the terminal environment. In other words, the front-end system and the control logic system can be provided as a user application such as a mobile application, and therefore, it is not necessary to access the server. Even the provision of services through web applications is changing with the advancement of offline such as Service Workers. However, server access to data sources cannot be avoided. In other words, by solving this, if the data source can be accessed without going through an always reachable server environment, the problems listed above can be solved and the system can be expanded and migrated smoothly.

(System Configuration, Operation Overview, and Characteristics)

Hereinafter, a configuration, an outline of an operation, and a feature of the system according to the present embodiment will be described. This system uses WebRTC Virtual Message bus (WebRTC virtual message hub). This is called WVMB.

The technology of the WVNB solves the aforementioned problems by using WebRTC based on P2P technology, enabling provision of an IoT solution through a common architecture that ranges from small to large. The WebRTC used in this embodiment is an example of technology for establishing a P2P connection, and is not limited thereto. P2P connection technology other than WebRTC may be used in this embodiment.

WebRTC uses technology called ICE (Interactive Connectivity Establishment) to determine addresses of two terminals used for P2P communication. In ICE, each terminal collects available addresses, exchanges the collected addresses between the terminals, and selects high priority addresses among communicable addresses to perform communication. For example, as P2P connection techniques other than WebRTC, a technique other than WebRTC using ICE may be used, and a P2P connection technique using an address decision method other than ICE may be used.

Figure 5:
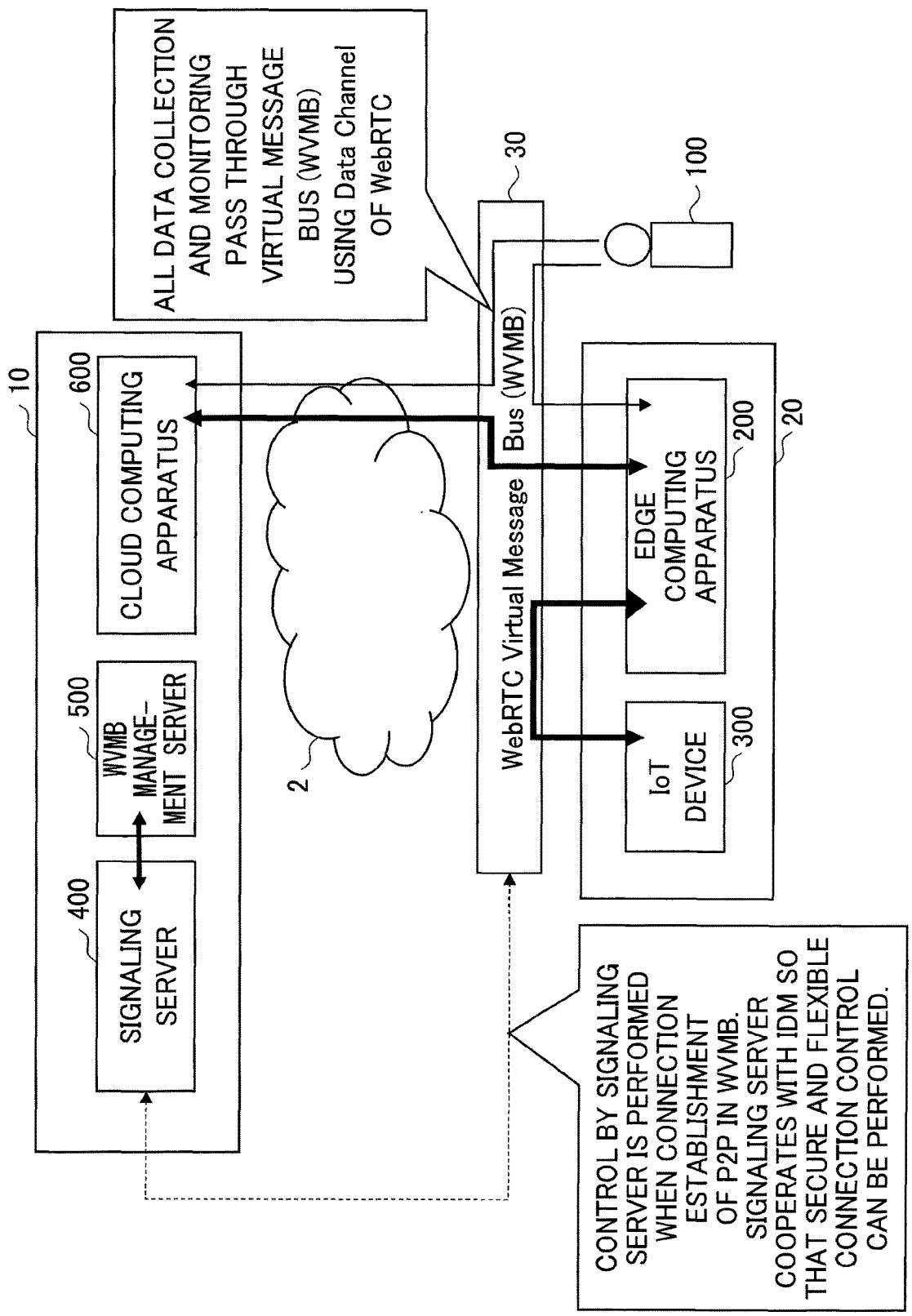
FIG. 5 is a system configuration diagram according to an embodiment of the present invention.

FIG. 5 is a system configuration diagram according to the present embodiment. As shown in FIG. 5, the system includes a signaling server 400, a WVMB management server 500, and a cloud computing apparatus 600 in the cloud 10. These apparatuses provided within the cloud 10 means, for example, that these devices are comprised of a virtual machine. However, the use of a virtual machine is an example, and the signaling server 400, the WVMB management server 500, and the cloud computing apparatus 600 may be physical servers, respectively, regardless of whether they are in the cloud 10.

An IoT device 300 and an edge computing apparatus 200 are provided within a base 20 (which may be referred to as an edge 20) in an edge. There is also a user terminal 100 utilizing services of the edge computing device 200 and the cloud computing apparatus 600. These apparatuses are capable of communicating with other apparatuses via a network (for example, the Internet 2 in this embodiment).

More specifically, communication between apparatuses may be performed via a data channel (also referred to as a P2P connection) built on the network 2 by a P2P connection establishing process using WebRTC. This data channel is called WebRTC Virtual Message bus (WVMB) 30. Data collection, monitoring, etc. are conducted via the WVMB 30. In addition, In the P2P connection establishment, control by the signaling server 400 is performed. The signaling server 400 coordinates with an IDM or the like so that it is possible to perform secure and flexible connection control. The above-described control by the signaling server 400 is to perform connection control and the like in cooperation with the WVMB management server 500 (example in IDM) based on the after-mentioned Agent ID, in addition to signaling control (which itself is an existing technology) for establishing the P2P connection by the WebRTC.

The functional configuration and operation of each apparatus will be described in detail later. Here, an outline of the operation and features will be described.

In order to implement the WVMB 30, a WVMB agent is installed in the user terminal 100, the edge computing device 200, the IoT device 300, and the cloud computing apparatus 600, and a WebRTC data channel is established in response to a connection request, and the apparatuses are connected to each other via P2P. Since WebRTC is used here, each apparatus does not need to be IP-reachable at all times.

The WebRTC signaling server 400 performs access control in cooperation with the IDM at the time of a connection request from the user terminal 100 and dynamically forms a P2P connection for data connection between an authorized user terminal 100 and a connection destination. The P2P connection functions as a virtual message bus and serves as a mechanism for the user terminal 100 to communicate with each data source. It is not necessary to install a server on a DMZ or to establish a VPN connection in advance. All P2P connections (data paths) are established dynamically in response to connection requests from the user application and are released upon termination of the application. Only the connectivity to the signaling server 400 must be secured, but communication with the signaling server 400 is performed only when starting and ending P2P connection establishment, and data communication is not always performed. For this reason, it is easy to maintain scalability against an increase in the number of edge devices.

It is also a characteristic that gradual system migration is easy. Because the WVMB uses a virtual messaging bus, connection to the WVMB can be flexibly controlled on demand by the signaling server 400, no matter where a specific apparatus is in the cloud or at the edge. Therefore, for example, in the initial stage of system installation, the user terminal 100 may connect, via WVMB, to the IoT device itself or to a data management unit of the edge where a plurality of IoT devices are aggregated. When migrating to a cloud type, the user terminal 100 may connect to a data management unit of the cloud via the WVMB. When a hybrid type is used, the signaling server 400 undertakes a role of distributing connections to each data source of the cloud/edge to be accessed according to a request. Therefore, it is not necessary to set an IP address of a connection destination in advance to each front-end or control system. This dramatically reduces management costs, such as system migration, and addition, deletion, and modification of edges.

It is also flexible in changing IP addresses. Especially in the edge environment, an IP address to a device is often provided by DHCP, etc., and the IP address is often changed by restarting the device. In addition, IaaS is often used as cloud computing in recent years, but in most cases, when VM (Virtual Machine) reconstruction is carried out, the internal IP address is changed.

Since the WVMB uses an ID (Agent ID described later) uniquely provided to each device and cloud server when creating a virtual message bus, the virtual message bus is formed independently of the IP address of each apparatus. Therefore, even in the edge environment and the IaaS environment where IP address changes frequently occur, the system can be operated without problems.

It is robust in terms of security. In the WVMB, it is not necessary to open an external access port in each device or in an edge/cloud computing environment. Communication with the outside is always via a P2P connection formed by the signaling server 400. This makes it difficult to attack devices and computing environments even if malware breaks into an edge environment. Furthermore, even if malware breaks into an internal device or computing environment, if it is detected by the signaling server 400 side, the device or computing environment can be disconnected from the system simply by performing an operation such as rejecting the connection request of the P2P connection. Accordingly, it is possible to realize connection between apparatuses and security management integratedly and simply even in a complex distributed hybrid environment.

Hereinafter, an example of configuration and operation of each device will be described in detail.

(Equipment Configuration)

The functional configuration each apparatus will be described with reference to FIGS. 6 to 11.

Figure 6:
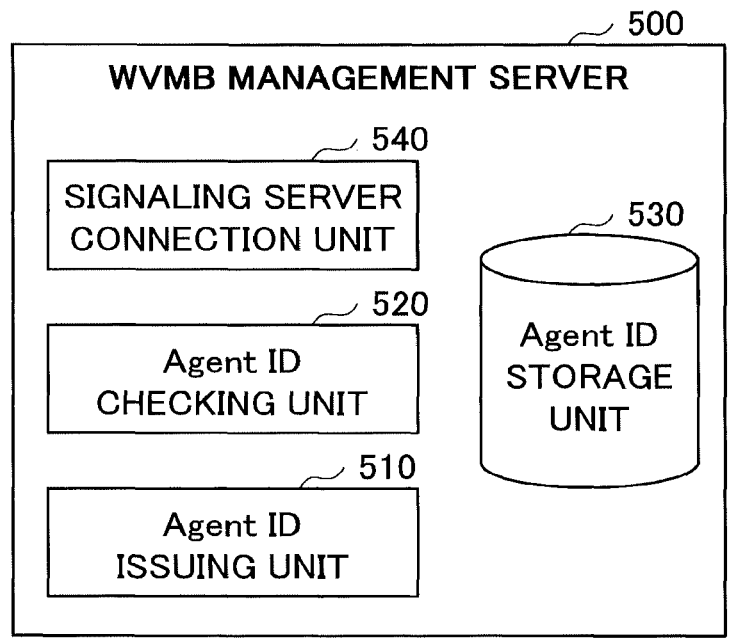
FIG. 6 is a block diagram of a WVMB management server 500.

FIG. 6 is a diagram illustrating a configuration of the WVMB management server 500. The WVMB management server 500 is a server that manages each WVMB agent and includes an Agent ID issuing unit 510, an Agent ID checking unit 520, an Agent ID storage unit 530, and a signaling server connection unit 540.

The Agent ID issuing unit 510 issues agent-specific temporary IDs to each WVMB agent. The issued ID is stored in the Agent ID storage unit 530, which will be described later. The Agent ID confirming unit 520 checks whether the agent-agent connection is allowed. When checking it, the Agent ID confirming unit 520 refers to the Agent ID storage unit 530 which will be described later.

The Agent ID storage unit 530 is a database storing issued Agent IDs. For example, in connection propriety decision for a connection request requesting that an agent of an Agent ID1 and an agent of an Agent ID2 be connected, when the Agent ID1 and the Agent ID2 are stored in the Agent ID storage unit 530 as agent IDs that have been issued, it can be determined that they can be connected. Note that this is an example.

The signaling server connection unit 540 is a function unit that performs connection processing and data communication with the signaling server 400.

Figure 7:
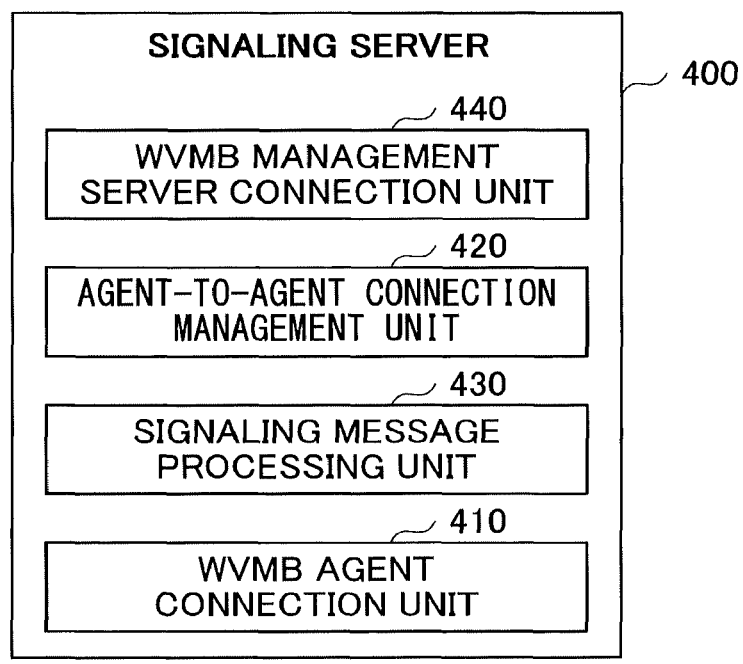
FIG. 7 is a block diagram of a signaling server 400.

FIG. 7 is a diagram illustrating a configuration of the signaling server 400. The signaling server 400 is a server that exchanges signaling messages for establishing a P2P connection between WVMB agents via WebRTC.

As shown in FIG. 7, the signaling server 400 includes a WVMB agent connection unit 410, an agent-to-agent connection management unit 420, a signaling message processing unit 430, and a WVMB management server connection unit 440.

The WVMB agent connection unit 410 is a function unit that performs connection processing and data communication with each WVMB agent. The agent-to-agent connection management unit 420 makes inquiries to the WVMB management server 500 and determines whether or not to connect between agents, whether or not to connect via the Internet, and the like. For example, the agent-to-agent connection management unit 420 may be provided with a function to determine whether or not the connection between the agents can be made without making inquiry to the WVMB management server 500.

The signaling message processing unit 430 relays the signaling message between agents. Examples of signaling messages are offer SDP (connection request), answer SDP, ICE candidate, etc. There are some signaling messages ICE candidate is included in SDP.

The signaling message processing unit 430 performs message discarding and change processing in accordance with instructions from the agent-to-agent connection management unit 420. For example, if an agent-to-agent connection is not allowed, all messages sent and received between the agents are discarded. If a connection via the Internet is not allowed, a relevant ICE candidate message (e.g., a message containing an address acquired by STUN or TURN) is discarded. The WVMB management server connection unit 440 performs connection processing and data communication with the WVMB management server 500.

The WVMB management server 500 and the signaling server 400 may be configured as one apparatus. When they are configured as one apparatus, the data transmission and reception processing, etc. between the WVMB management server 500 and the signaling server 400 described in this embodiment corresponds to operation in the inside of the one apparatus.

Next, the user terminal 100, the IoT device 300, the edge computing apparatus 200, and the cloud computing apparatus 600 will be described. These apparatuses are connected to each other using the WVMB. The user terminal 100 monitors sensor data and the like. The IoT device 300 (e.g., sensor device) performs processing such as transmitting sensor data to the edge computing apparatus 200. The edge computing apparatus 200 collects the sensor data and transmits the monitoring data to the user terminal 100. The cloud computing apparatus 600 may also collect sensor data and transmit monitoring data to the user terminal 100.

Each apparatus contains a WVMB agent through which data communication between the apparatuses is performed by a WebRTC data channel. Each of the user terminal 100, the IoT device 300, the edge computing apparatus 200, and the cloud computing apparatus 600 may be referred to as a message bus agent apparatus.

Figure 8:
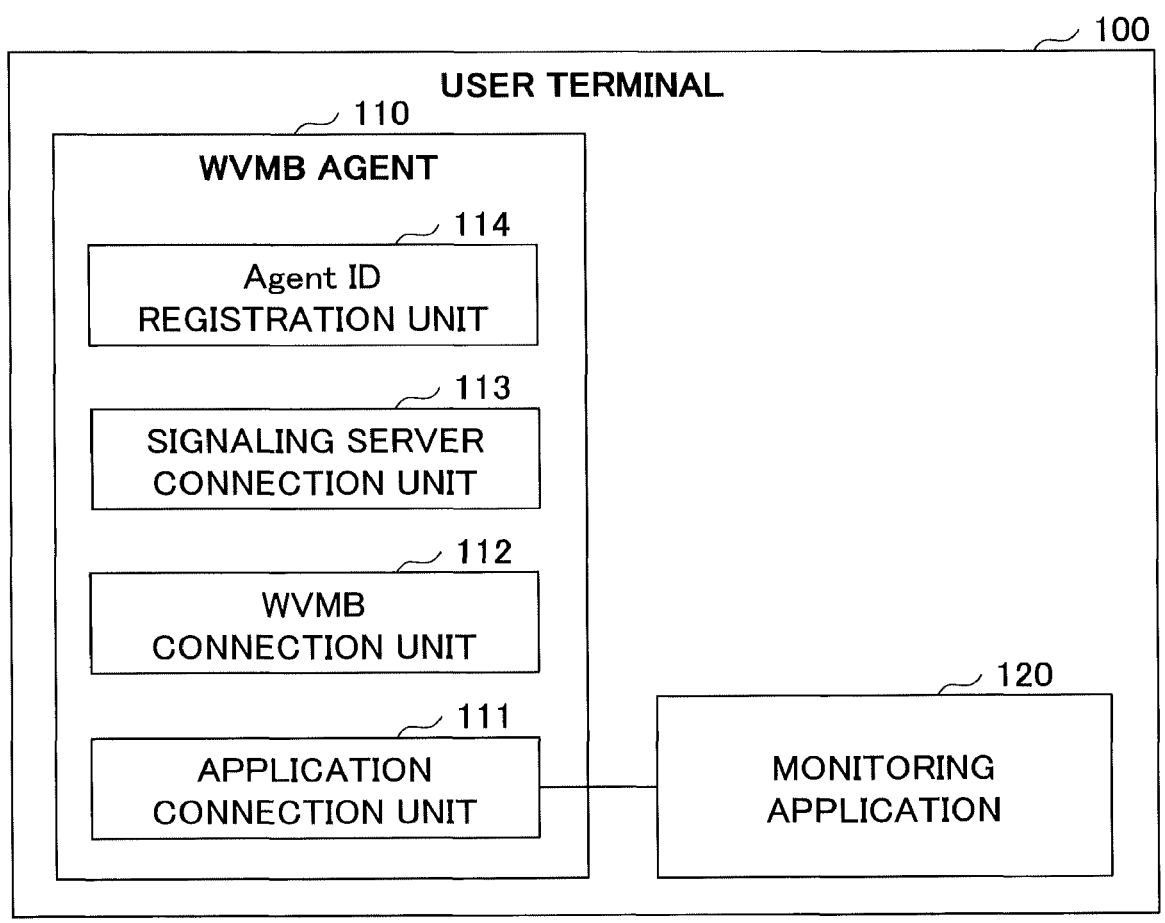
FIG. 8 is a block diagram of a user terminal 100.

FIG. 8 is a diagram illustrating a configuration of the user terminal 100. As shown in FIG. 8, the user terminal 100 includes a WVMB agent 110 and a monitoring application 120 that performs monitoring.

The WVMB agent 110 is an agent unit that performs WVMB communication processing and includes an application connection unit ill, a WVMB connection unit 112, a signaling server connection unit 113, and an Agent ID registration unit 114.

The application connection unit 111 connects with the monitoring application 120 and transmits data passed from the monitoring application 120 to the WVMB connection unit 112 and transmits data passed from the WVMB connection unit 112 to the monitoring application 120. The WVMB connection unit 112 connects with other WVMB agents and performs data transmission and reception processing using a data channel established by WebRTC between agents.

In order to perform P2P connection processing between WVMB agents, the signaling server connection unit 113 connects with the signaling server 400 and transmits and receives signaling messages to/from the signaling server 400. The Agent ID registering unit 114 registers the Agent ID issued from the WVMB management server 500.

Figure 9:
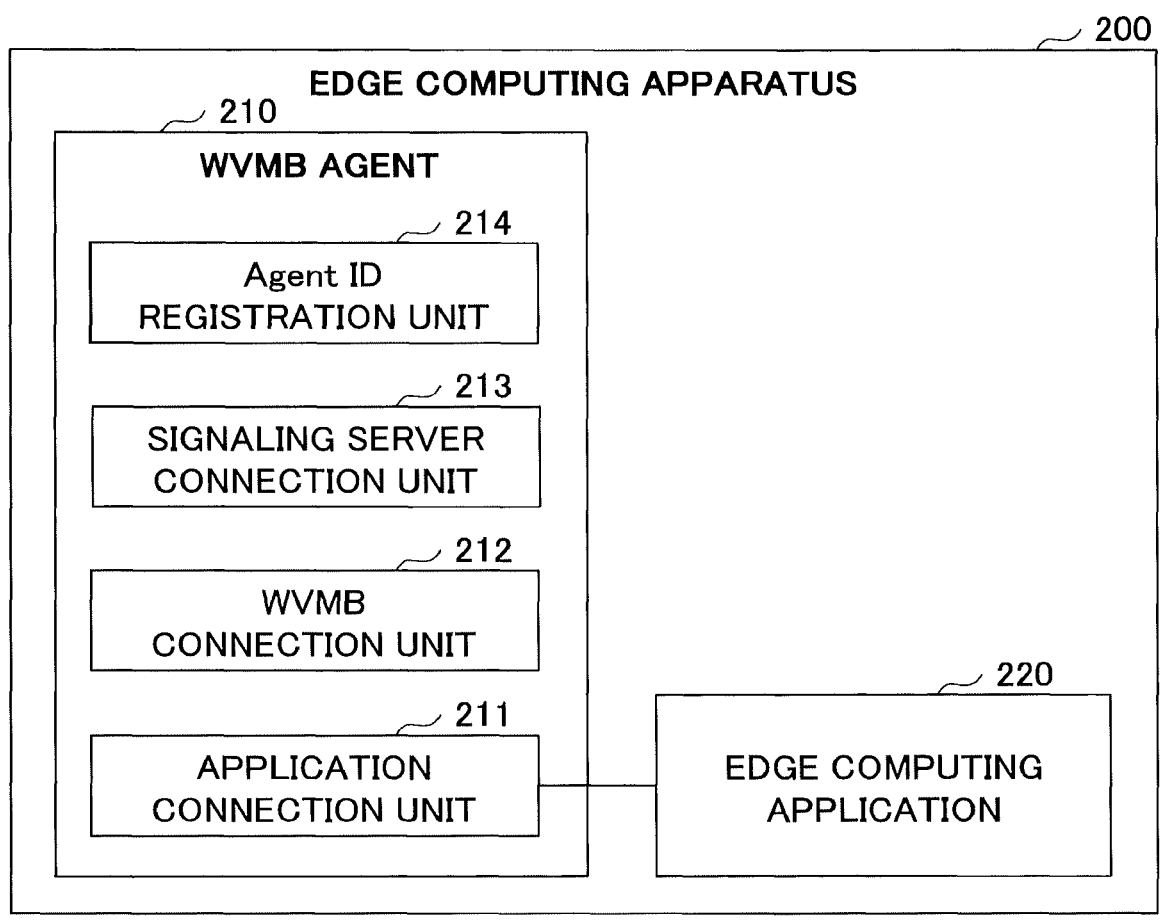
FIG. 9 is a block diagram of an edge computing apparatus 200.

FIG. 9 is a diagram illustrating a configuration of the edge computing apparatus 200. As shown in FIG. 9, edge computing apparatus 200 includes a WVMB agent 210 and an edge computing application 220 that performs edge computing.

Figure 10:
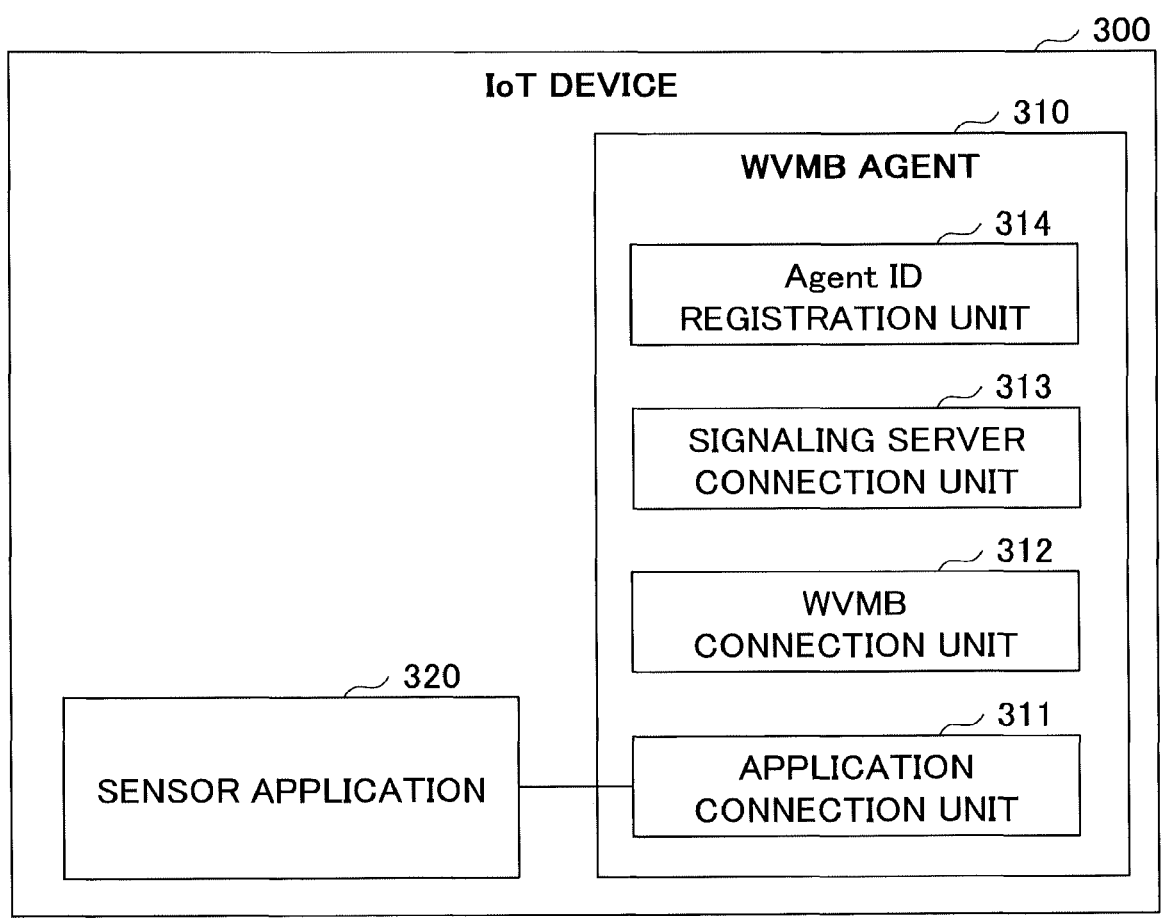
FIG. 10 is a block diagram of an IoT device 300.

FIG. 10 is a diagram illustrating a configuration of the IoT device 300. The IoT device 300 is assumed to be a sensor device. As shown in FIG. 10, the IoT device 300 includes a WVMB agent 310 and a sensor application 320 for performing sensor processing.

Figure 11:
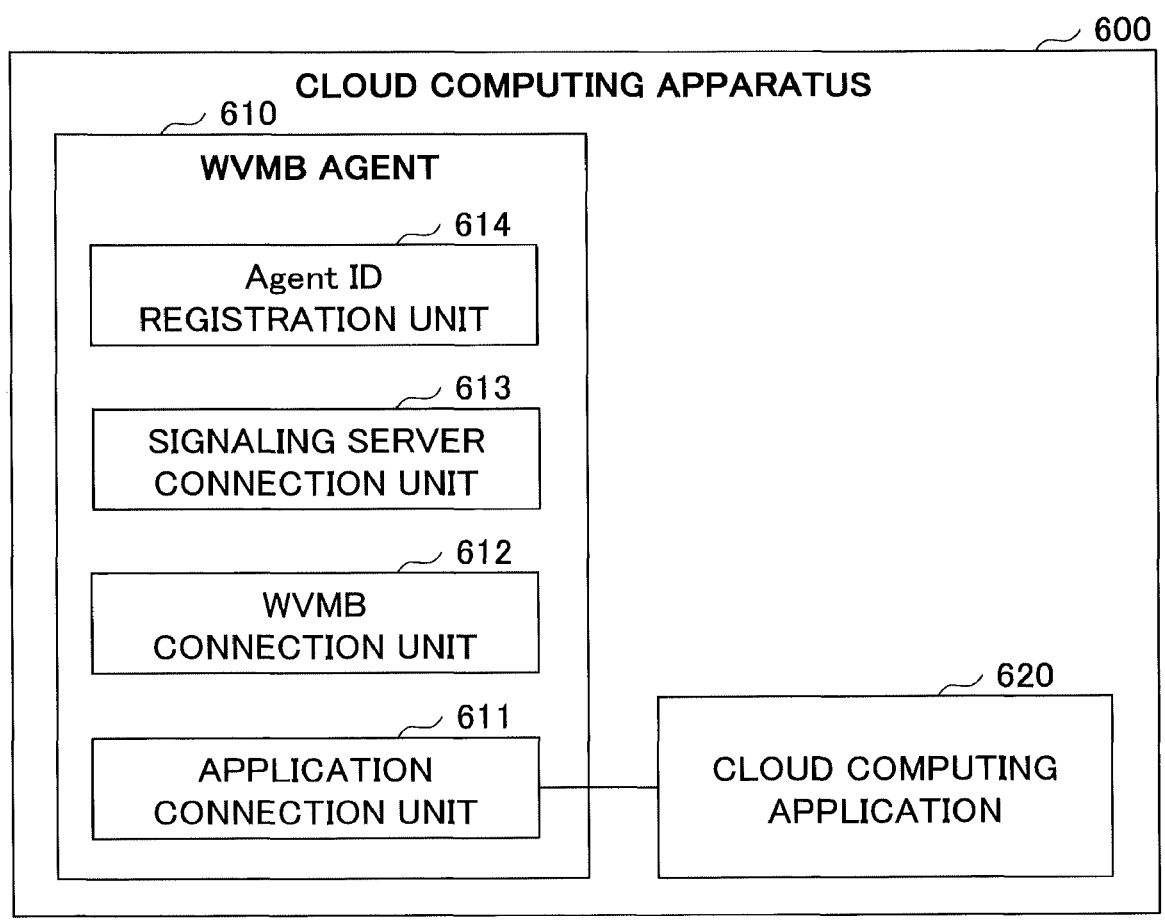
FIG. 11 is a block diagram of a cloud computing apparatus 600.

FIG. 11 is a diagram illustrating configuration of a cloud computing apparatus 600. As shown in FIG. 11, the cloud computing apparatus 600 includes a WVMB agent 610 and a cloud computing application 620 that performs cloud computing.

As shown in FIGS. 9-11, the configuration of the WVMB agent for each of the edge computing apparatus 200, the IoT device 300, and the cloud computing apparatus 600 is the same as the configuration of the WVMB agent 110 shown in FIG. 8, and its function is the same.

Figure 12:
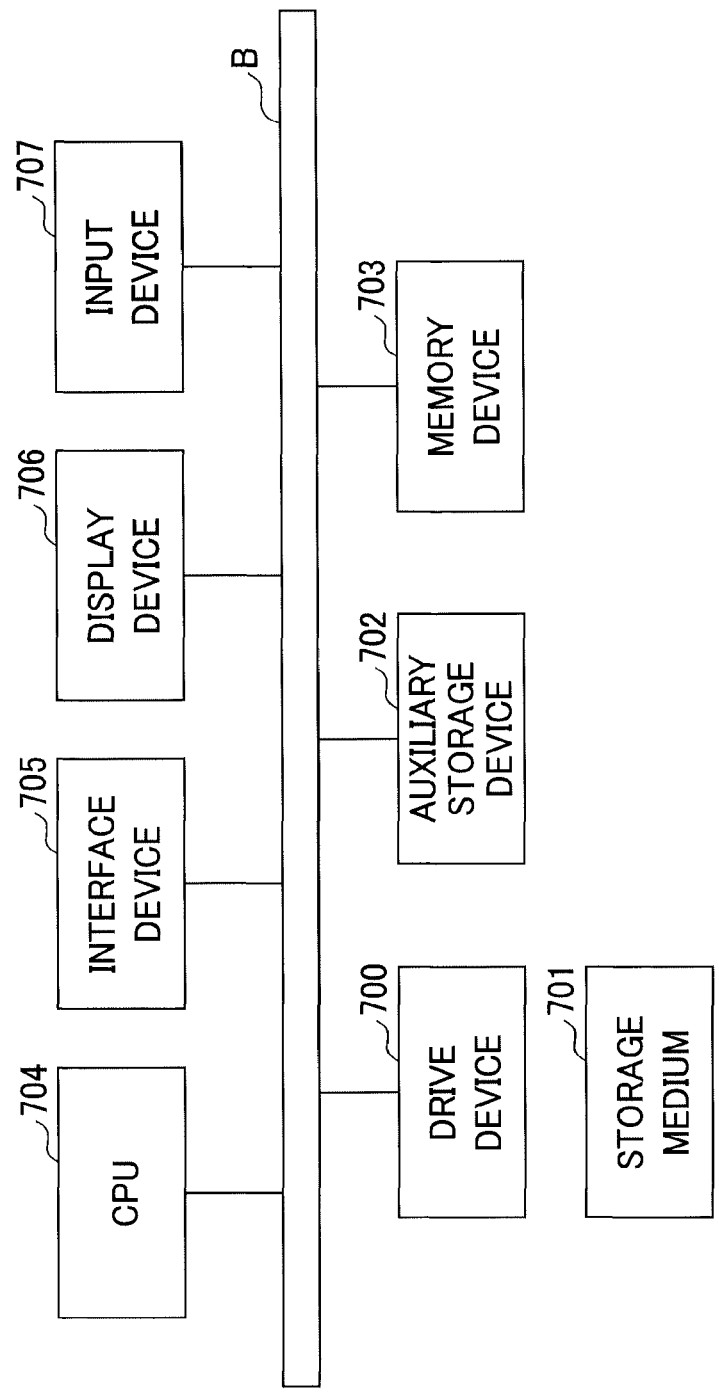
FIG. 12 is a diagram illustrating an example of a hardware configuration of each apparatus.

The WVMB management server 500, the signaling server 400, the user terminal 100, the edge computing apparatus 200, the IoT device 300, and the cloud computing apparatus 600 described above can all be realized by having a computer execute a program describing instructions described in this embodiment. FIG. 12 is a diagram illustrating an example of a hardware configuration of each apparatus. The apparatus of FIG. 12 includes a drive device 700, an auxiliary storage device 702, a memory device 703, a CPU 704, an interface device 705, a display device 706, an input device 707, and the like, each interconnected with a bus B.

A program for executing processing in the apparatus (the WVMB management server 500, the signaling server 400, the user terminal 100, the edge computing apparatus 200, the IoT device 300, or the cloud computing apparatus 600) is provided, for example, by a recording medium 701 such as a CD-ROM or a memory card. When the recording medium 701 storing the program is set in the drive device 700, the program is installed in the auxiliary storage device 702 from the recording medium 701 via the drive device 700. However, the installation of the program is not necessarily performed by the recording medium 701, and the program may be downloaded from another computer via the network. The auxiliary storage device 702 stores the installed program and stores necessary files, data, and the like.

The memory device 703 reads out and stores a program from the auxiliary storage device 702 when an instruction to start a program is issued. The CPU 704 realizes the functions of the apparatus according to the program stored in the memory device 703. The interface device 705 is used as an interface for connecting to a network. The display device 706 displays a GUI (Graphical User Interface) or the like by a program. The input device 707 may comprise a keyboard and a mouse, button, touch panel, or the like, and is used to input various operating instructions. In apparatuses other than the user terminal 100 the display device 706 and/or the input device 707 may not be provided.

(Example of operation) Next, an operation example (sequence example) in a system consisting of each apparatus configured as described above will be described with reference to a sequence diagram of FIG. 13.

Here, as an example, the case of edge computing will be described. Specifically, the following actions are assumed.

(1) The IoT device 300 (here, a temperature sensor) uses the WVMB to transmit data every second to the edge computing apparatus 200 and store it in the DB within the edge computing apparatus 200.

(2) The user accesses the data stored by the process of (1) using the WVMB and checks it with graphs such as a dashboard UI.

<Step S100: Edge Computing Environment Registration>

Figure 13:
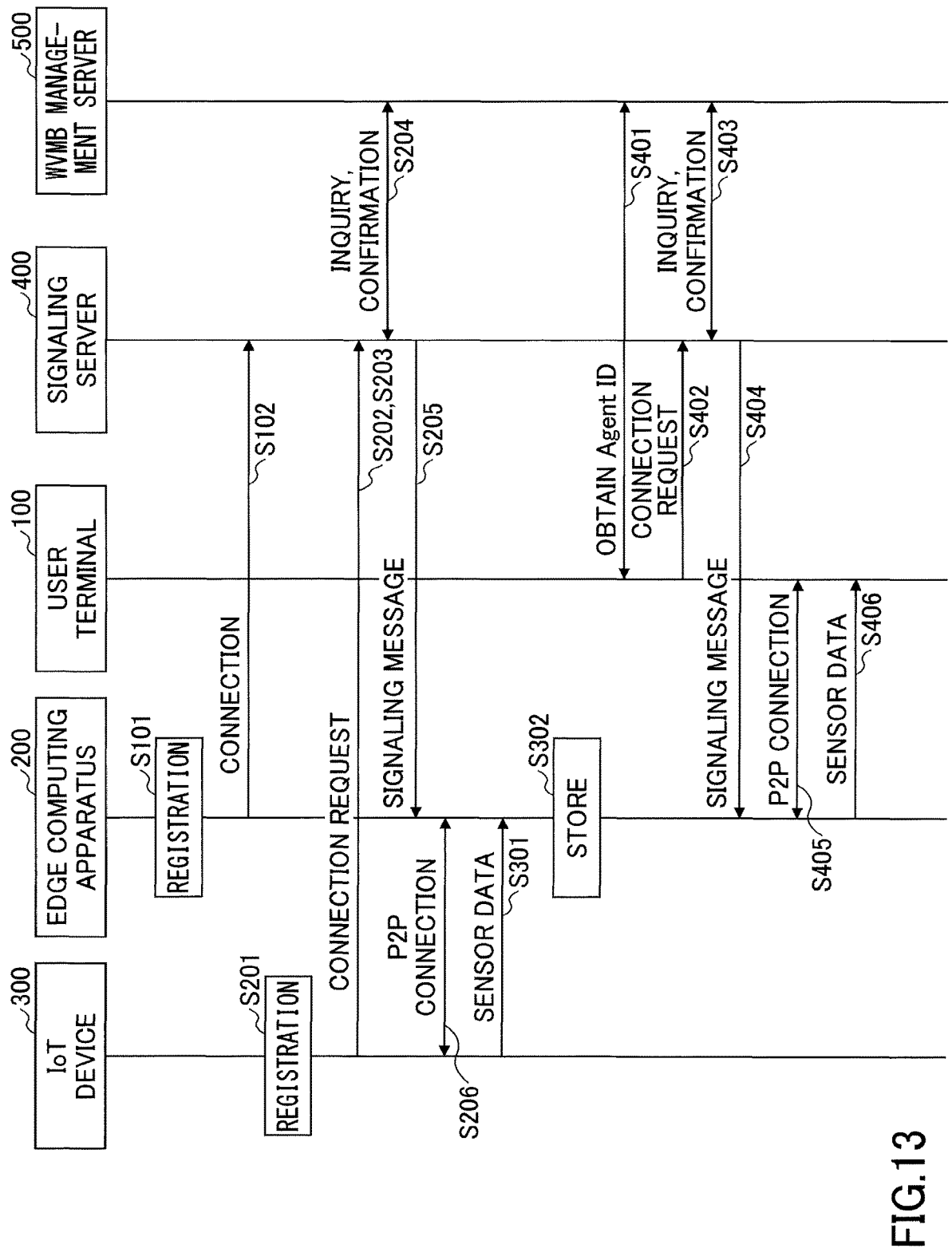
FIG. 13 shows an example sequence.

In step S101 of FIG. 13, at the initial installation of the edge computing apparatus 200, the WVMB agent ID (Agent ID) that is issued uniquely to the edge computing apparatus 200 from the Agent ID issuing unit 510 of the WVMB management server 500 is registered in the Agent ID registering unit 214 of the WVMB agent 210. The issuing means is not limited to a specific means, but includes, for example, issuing by e-mail, issuing by dedicated web console, and issuing orally via an operator.

When the agent ID registration is completed, in step S102, the WVMB agent 210 connects to the signaling server 400 by the signaling server connection unit 213.

<Step S200: Registration of the IoT Device and Connection to the Computing Environment>

In step S201, at the initial installation of the IoT device 300, an Agent ID issued uniquely to the IoT device 300 from the Agent ID issuing unit 510 of the WVMB management server 500 is registered in the Agent ID registering unit 314 of the WVMB agent 310. The issuing means is as described above.

When registration is completed, in step S202, the WVMB agent 310 initiates continuous connection to the signaling server 400 by the signaling server connection unit 313. When the connection is started, in step S203, the WVMB agent 310 transmits a connection request (for example, a signaling message such as an offer SDP) for the edge computing apparatus 200 set in step S100 to the signaling server 400 by specifying the Agent ID of the edge computing apparatus 200. The signaling message of the connection request also includes the Agent ID of the connection source.

In step S204, in the signaling server 400, the agent-to-agent connection management unit 420 inquires to the WVMB management server 500 about the Agent ID of the connection source and the connection destination to determine whether or not the connection between the connection source and the connection destination is permitted. The signaling server 400 transmits a signaling message (e.g., an answer SDP) by the signaling message processing unit 430 to the WVMB agent 210 of the opposing edge computing apparatus 200 only when information indicating that a connection is permitted is received (step S205).

Thereafter, for example, in step S206, a P2P connection of a data channel by WebRTC is formed between the IoT device 300 and the edge computing apparatus 200 by the WVMB connection unit 312 in the WVMB agent 310 of the IoT device 300 and the WVMB connection unit 212 in the WVMB agent 210 of the edge computing apparatus 200 through exchange of ICE candidate messages via the signaling server 400 between the IoT device 300 and the edge computing apparatus 200, thereby bidirectional data communication is enabled.

<Step S300: Sensor Data Transmission>

In step S301, when the application connection unit 311 receives sensor data acquired every second by the sensor application 320 in the IoT device 300, the WVMB connection unit 312 transmits the sensor data to the edge computing apparatus 200.

In step S302, in the edge computing apparatus 200 that received data by the WVMB connection unit 212, the data is passed to the edge computing application 220 through the application connection unit 211 and stored in an internal DB.

<Step S400: Check of Sensor Data by the User>

In step S401, the user terminal 100 connects to the WVMB management server 500 and acquires the Agent ID of the edge computing apparatus 200 from the WVMB management server 500. At this time, the WVMB management server 500 provides a temporary Agent ID to the user terminal 100.

In step S402, the user terminal 100 connects to the signaling server 400 and specifies the Agent ID of the edge computing device 200, thereby initiates a connection request to the edge computing device 200. The connection request also includes a temporary Agent ID of the user terminal 100.

In step S403, in the signaling server 400, the agent-to-agent connection management unit 420 makes an inquiry to the WVMB management server 500 about Agent IDs of the connection source and the connection destination to determine whether or not the connection between the connection source and the connection destination is permitted. In step S404, the signaling server 400 transmits the signaling message to the WVMB agent 210 of the corresponding edge computing apparatus 200 by the signaling message processing unit 430 only when information indicating that the connection is permitted is received.

In Step S405, the WVMB connection unit 112 in the WVMB agent 110 of the user terminal 100 and the WVMB connection unit 212 in the WVMB agent 210 of the edge computing apparatus 200 establish a P2P connection of the data channel by the WebRTC between the user terminal 100 and the edge computing apparatus 200, thereby bidirectional data communication is enabled.

In step S406, the sensor data stored in the DB of the application 220 of the edge computing device 200 is transmitted by the WVMB connection unit 212 to the WVMB connection unit 112 of the user terminal 100, and the monitoring application 120 acquires the sensor data. The monitoring application 120 graphically displays the sensor data on the user terminal 100.

(Variations, Effects, etc.)

In step S400 (check of sensor data by the user) described above, as shown in FIG. 14, the user terminal 100 may be present at the local NW of the edge base 20 or may be present in a remote environment. In WebRTC, a P2P connection can be established regardless of local or remote, using a protocol called ICE as previously described. For this reason, the NW environment to which the user is connected may be anywhere. Accordingly, it is not necessary to change the connection destination according to the location of the user terminal 100 and to make VPN connection.

Further, as illustrated in FIG. 15, when it is desired to reject connection from the user terminal 100 to the edge computing apparatus 200 or the like, the signaling message processing unit 430 of the signaling server 400 may discard route candidate information from the remote environment among the ICE candidate messages. Accordingly, it can be realized to enable access only from the local environment. The route candidate information from the remote environment is, for example, information indicating a NAT traversal connection (information including a global IP address acquired by STUN and/or a global IP address of TURN).

Further, by performing the above control for each connecting user, for example, an administrator is allowed to connect remotely, and a person in charge is allowed to access only when connecting from the local NW, thereby flexible access control is allowed. As to connection destination, rather than simply dropping route candidates via a remote location, it is also possible to perform control such as allowing access from a specific remote base by checking the global IP address.

In the example described above, access to the edge computing apparatus 200 is taken as an example. However, access to the cloud computing apparatus 200 can be realized in the same flow.

In a hybrid environment, WVMB agents may be installed in both edge computing apparatus 200 and the cloud computing apparatus 600, and connection setting is performed. In the above example, for example, the edge environment stores data every second, and the edge WVMB agent 210 transmits average data per minute to the cloud 10. The user only needs to select the Agent ID of the WVMB agent to connect to, depending on data to be referenced. In this manner, location-free data access independent of installation location is possible.

Note that in the flow above, the reception and transmission sources of data (the WVMB agents) do not have to open a port to the outside. As previously described, data connections (P2P connections) are formed dynamically by control of the signaling server 400 at any time. For this reason, it is difficult to crack from the outside due to constantly opening the service port. In this example, it is only necessary to open a port number required for outgoing WebRTC.

Furthermore, security can be further improved by cooperating with SD-WAN (Software Defined WAN), which has been attracting attention in recent years. For example, as shown in FIG. 16, an SD-WAN controller 800 is provided. When connecting to the WVMB (when forming a P2P connection), the signaling server 400 extracts a connection UDP port number by ICE. The signaling server 400 and the SD-WAN controller 800 cooperate with each other to change the FW (Firewall) settings of the cloud and the edge by the SD-WAN controller 800 to enable dynamic connection. This prevents malware and the like from connecting externally. More specifically, for example, the outgoing port is always prohibited, and the SD-WAN controller 800 releases the port and the destination address only when the P2P connection is established in response to a request from the signaling server 400. Of course, when P2P is disconnected, the open port is prohibited. In this manner, the level of security can be further increased.

SUMMARY OF EMBODIMENTS

As described above, according to the present embodiment, there is provided a message bus agent apparatus that is used as a first message bus agent apparatus in a system including a message bus management server, a signaling server, the first message bus agent apparatus, and a second message bus agent apparatus, the message bus agent apparatus including:

signaling means that transmits, to the signaling server, a signaling message in which an agent ID of the second message bus agent apparatus issued from the message bus management server is designated as a connection destination; and connection means that establishes a connection with the second message bus agent apparatus as a virtual message bus based on processing of a signaling message by the signaling server.

The user terminal 100, the edge computing apparatus 200, the IoT device 300, and the cloud computing apparatus 600 are all examples of the message bus agent apparatus.

For example, if the message bus management server permits a connection between the message bus agent apparatus and the second message bus agent apparatus, the connection means establishes a connection with the second message bus agent apparatus.

According to the present embodiment, there is provided a signaling server in a system including a message bus management server, the signaling server, a first message bus agent apparatus, and a second message bus agent apparatus, the signaling server including:

reception means that receives, from the first message bus agent apparatus, a signaling message in which an agent ID of the second message bus agent apparatus issued from the message bus management server is designated as a connection destination; and transmission means that transmits, to the message bus management server, an inquiry about propriety of connection between the first message bus agent apparatus and the second message bus agent apparatus, and when the connection is permitted, transmits a signaling message to the second message bus agent apparatus. The signaling server 400 is an example of the signaling server described above.

In addition, according to the present embodiment, there is provided a message bus management server in a system including the message bus management server, a signaling server, a first message bus agent apparatus, and a second message bus agent apparatus, the message bus management server including:

issuing means that issues an agent ID for each message bus agent apparatus; and transmission means that receives an inquiry about propriety of connection between the first message bus agent apparatus and the second message bus agent apparatus from the signaling server that receives, from the first message bus agent apparatus, a signaling message in which an agent ID of the second message bus agent apparatus is designated as a connection destination, and transmits a decision result of the propriety of the connection to the signaling server. The WVMB management server 500 is an example of the message bus management server.

Although the present embodiment has been described above, the present invention is not limited to such specific embodiments, and various modifications and changes are possible within the scope of the present invention as claimed.

The present patent application claims priority based on U.S. provisional application No. 62/475,286, filed in the USPTO on Mar. 23, 2017 and Japanese patent application No. 2017-098501, filed in the JPO on May 17, 2017, and the entire contents of the U.S. provisional application No. 62/475,286 and the Japanese patent application No. 2017-098501 are incorporated herein by reference.

DESCRIPTION OF SYMBOLS

100 User terminal
110, 210, 310, and 610 WVMB agent
111, 211, 311, 611 application connection unit
112, 212, 312, 612 WVMB connection unit
113, 213, 313, 613 signaling server connection unit
114, 214, 314, 614 Agent ID Registration unit
120 monitoring applications
200 edge computing apparatus
220 edge computing application
300 IoT device irrespective
320 sensor application
400 signaling server
410 WVMB agent connection unit
420 agent-to-agent connection management unit
430 signaling message processing unit
440 WVMB management server connection unit
500 WVMB management server
510 Agent ID issuing unit
520 Agent ID checking unit
530 Agent ID storage unit
540 signaling server connection unit
600 cloud computing apparatus
620 cloud computing application
700 drive device
701 recording medium
702 auxiliary storage device
703 memory device
704 CPU
705 interface device
706 display device
707 input device

The invention claimed is:

1. An IoT device that is used as a first message bus agent apparatus in a system including a message bus management server, a signaling server, the first message bus agent apparatus, and a second message bus agent apparatus, the IoT device comprising:

processing circuitry configured to
transmit, to the signaling server, a signaling message in which an agent ID of the second message bus agent apparatus issued from the message bus management server is designated as a connection destination; and
establish a connection with the second message bus agent apparatus as a virtual message bus based on processing of a signaling message by the signaling server, wherein, when the message bus management server permits connection between the IoT device and the second messaging bus agent apparatus, the processing circuitry establishes the virtual message bus with the second message bus agent apparatus, and wherein the virtual message bus is a plurality of peer-to-peer (P2P) connections that are each configured to be established dynamically in response to a connection request from an application and released upon termination of the application, the virtual message bus being configured to provide dynamic interconnectivity between a plurality of at least three bus agent apparatuses which each include a specific agent application installed thereon, the at least three bus agent apparatuses including the first message bus agent apparatus and the second message bus agent apparatus, each of the P2P connections being formed independently of an IP address of any of the at least three bus agent apparatuses.

2. A connection establishment method executed by an IoT device that is used as a first message bus agent apparatus in a system including a message bus management server, a signaling server, the first message bus agent apparatus, and a second message bus agent apparatus, the connection establishment method comprising:

transmitting, by processing circuitry of the IoT device, to the signaling server, a signaling message in which an agent ID of the second message bus agent apparatus issued from the message bus management server is designated as a connection destination; and
establishing, by the processing circuitry, a connection with the second message bus agent apparatus as a virtual message bus based on processing of a signaling message by the signaling server, wherein, when the message bus management server permits connection between the IoT device and the second messaging bus agent apparatus, the method includes establishing the virtual message bus with the second message bus agent apparatus, and wherein the virtual message bus is a plurality of peer-to-peer (P2P) connections that are each configured to be established dynamically in response to a connection request from an application and released upon termination of the application, the virtual message bus being configured to provide dynamic interconnectivity between a plurality of at least three bus agent apparatuses which each include a specific agent application installed thereon, the at least three bus agent apparatuses including the first message bus agent apparatus and the second message bus agent apparatus, each of the P2P connections being formed independently of an IP address of any of the at least three bus agent apparatuses.

3. A signaling server in a system including a message bus management server, the signaling server, a first message bus agent apparatus which is an IoT device, and a second message bus agent apparatus, the signaling server comprising:
processing circuitry configured to
receive, from the IoT device, a signaling message in which an agent ID of the second message bus agent apparatus issued from the message bus management server is designated as a connection destination; and
transmit, to the message bus management server, an inquiry about propriety of connection between the IoT device and the second message bus agent apparatus, and when the connection is permitted, transmits a signaling message to the second message bus agent apparatus,
wherein a virtual message bus is established between the IoT device and the second message bus agent apparatus based on the signaling message, and
wherein the virtual message bus is a plurality of peer-to-peer (P2P) connections that are each configured to be established dynamically in response to a connection request from an application and released upon termination of the application, the virtual message bus being configured to provide dynamic interconnectivity between a plurality of at least three bus agent apparatuses which each include a specific agent application installed thereon, the at least three bus agent apparatuses including the first message bus agent apparatus and the second message bus agent apparatus, each of the P2P connections being formed independently of an IP address of any of the at least three bus agent apparatuses.

4. A message bus management server in a system including the message bus management server, a signaling server, a first message bus agent apparatus which is an IoT device, and a second message bus agent apparatus, the message bus management server comprising:
processing circuitry configured to
issue an agent ID for each message bus agent apparatus; and
receive an inquiry about propriety of connection between the IoT device and the second message bus agent apparatus from the signaling server that receives, from the IoT device, a signaling message in which an agent ID of the second message bus agent apparatus is designated as a connection destination, and transmits a decision result of the propriety of the connection to the signaling server,
wherein a virtual message bus is established between the IoT device and the second message bus agent apparatus when the IoT device and the second message bus agent apparatus can be connected, and
wherein the virtual message bus is a plurality of peer-to-peer (P2P) connections that are each configured to be established dynamically in response to a connection request from an application and released upon termination of the application, the virtual message bus being configured to provide dynamic interconnectivity between a plurality of at least three bus agent apparatuses which each include a specific agent application installed thereon, the at least three bus agent apparatuses including the first message bus agent apparatus and the second message bus agent apparatus, each of the P2P connections being formed independently of an IP address of any of the at least three bus agent apparatuses.

5. A non-transitory computer readable recording medium storing a program for causing a computer to function as the processing circuitry of the signaling server as claimed in claim 3.

6. A non-transitory computer readable recording medium storing a program for causing a computer to function as the processing circuitry of the IoT device as claimed in claim 1.

7. A non-transitory computer readable recording medium storing a program for causing a computer to function as the processing circuitry of the message bus management server as claimed in claim 4.

* * * * *